April 5, 1955 S. ALLEN ET AL 2,705,401
VAPORISING MEANS FOR LIQUID FUEL COMBUSTION CHAMBERS
Filed Nov. 24, 1951 2 Sheets-Sheet 1
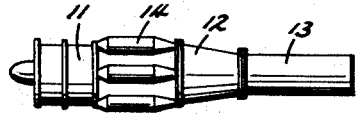
Fig.1
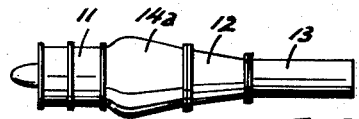
Fig.2
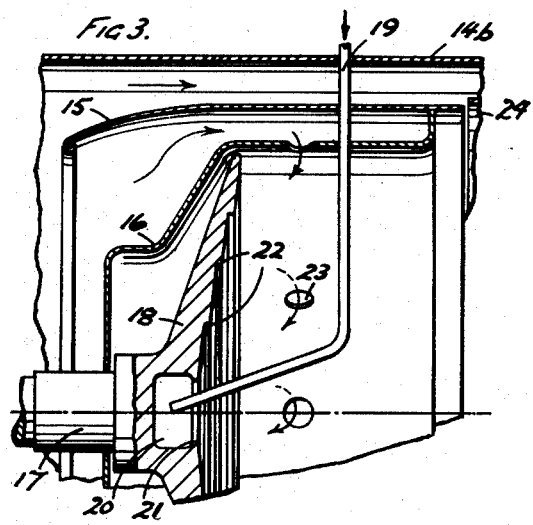
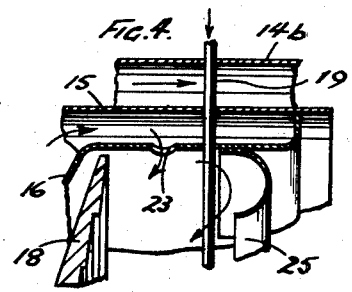
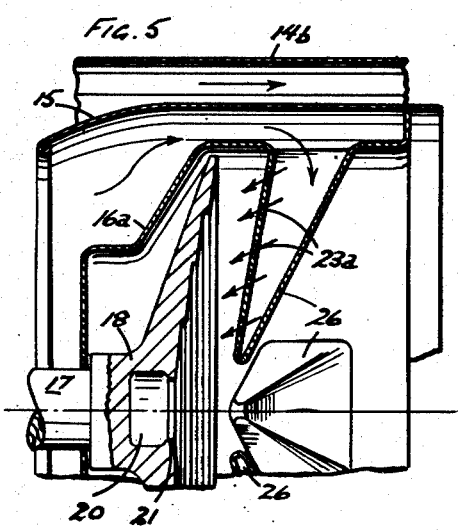
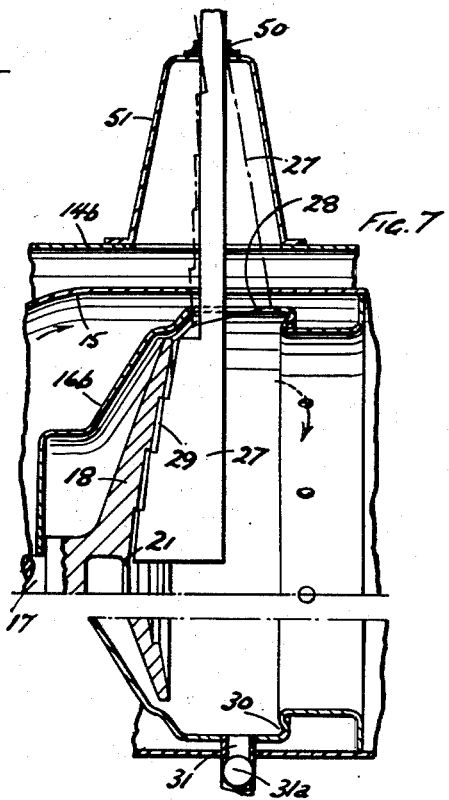
INVENTORS
SIDNEY ALLEN &
MORRIS AMOS STOKES
ATTYS.

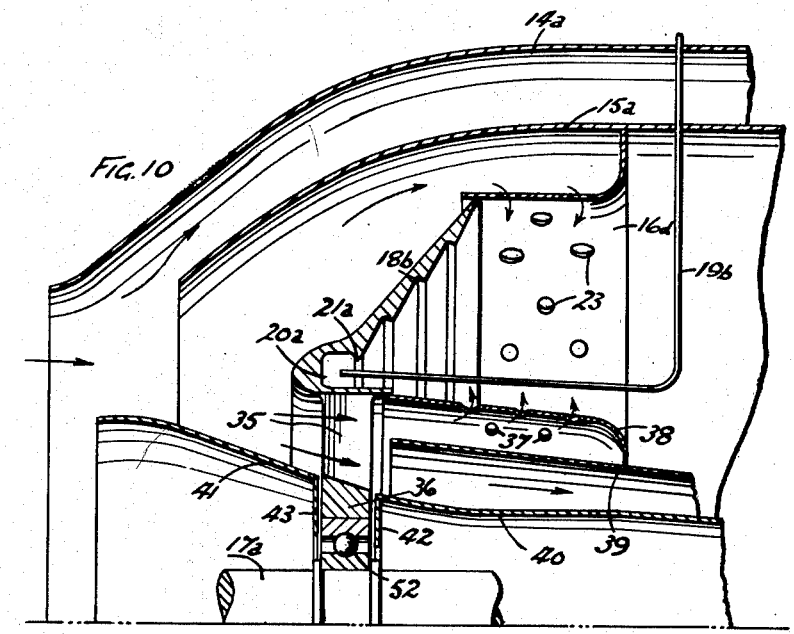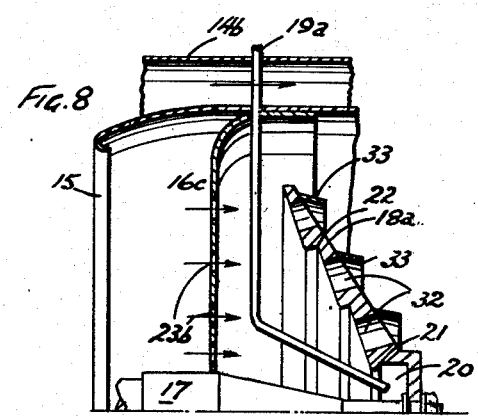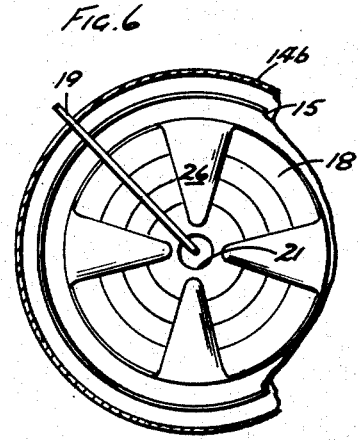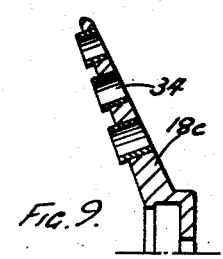
INVENTORS
SIDNEY ALLEN &
MORRIS AMOS STOKES
By Mawkinney & Mawkinney
ATTYS.

United States Patent Office 2,705,401
Patented Apr. 5, 1955

2,705,401

VAPORISING MEANS FOR LIQUID FUEL COMBUSTION CHAMBERS

Sidney Allen and Morris A. Stokes, Coventry, England, assignors to Armstrong Siddeley Motors Limited, Coventry, England Application November 24, 1951, Serial No. 258,018

Claims priority, application Great Britain December 2, 1950

8 Claims. (Cl. 60—39.74)

This invention relates to a liquid fuel combustion chamber of the kind in which a continuous, fast-moving mass of air can be heated by the combustion of liquid fuel in it, as in the case of a combustion chamber of a gas turbine engine.

The main object of the invention is to provide for complete combustion of the added fuel being effected in a combustion chamber of short length.

A further object is to facilitate the supplying of the fuel thereto.

A still further object is to enable a heavy, low-grade fuel to be satisfactorily used.

According to the invention, the combustion chamber includes a duct, for the air, having a flame chamber casing within and spaced from the walls of the duct, a disc-like member mounted at the upstream end of the flame chamber for rotation about an axis which is generally parallel to the air flow along the duct, the member having a concave, generally frusto-conical face which is stepped from as near as possible to its rotational axis up to its outer periphery, means for supplying liquid fuel on to the stepped face of the member as near as possible to its rotational axis (the member preferably having holes through it for the passage of the fuel when vaporised if the stepped face is upstream of the member), means for rotating the member about said axis to cause the fuel to travel across its stepped face towards its outer periphery, and means for diverting an appropriate portion of the air passing along the duct into the flame chamber (particularly if the stepped face of the member is not upstream of the member) to serve as combustion air.

There are two main forms of combustion chamber at present used in gas turbine engines, namely—that known as the "can" type comprising a circle of interconnected elongated units each providing an air duct and having a flame chamber as above-mentioned in the interior of the duct, and that known as the "annular" type in which the duct for the air is annular about the axis of the engine, and in which the flame chamber is like-wise of annular form; and the invention may be applied to either of these types.

As regards the "can" type of combustion chamber there is one of the disc-like members in the flame chamber of each of the elongated units, and these members may be mechanically driven in any convenient manner, or each may be provided with appropriate vanes whereby the air flow along the associated duct will effect the rotation. In regard to the "annular" type, there may be a single disc-like member in the form of a ring journalled to revolve about the axis of the engine, and it likewise may be driven either mechanically or by means of air vanes provided for it.

In the accompanying drawings:

Figure 1 is a side view of a gas turbine plant of the "can" type;

Figure 2 is a side view of a gas turbine plant of the "annular" type;

Figure 3 is a sectional view of an arrangement according to the invention of a combustion chamber of the "can" type;

Figure 4 is a sectional view of a different arrangement according to the invention of a combustion chamber of the "can" type;

Figure 5 is a sectional view of another different arrangement according to the invention of a combustion chamber of the "can" type;

Figure 6 is an axial view, to a reduced scale, of the construction of Figure 5;

Figure 7 is a sectional view illustrating a further arrangement of a combustion chamber of the "can" type;

Figure 8 is a sectional view illustrating yet another further arrangement of a combustion chamber of the "can" type;

Figure 9 is a radial section through an alternative disc-like member for the construction of Figure 8; and Figure 10 is a sectional view through a combustion chamber of the "annular" type arranged according to the invention.

Referring to Figures 1 and 2 the plant comprises a compressor 11, a turbine 12 and a jet pipe 13, the compressor and turbine being interconnected by a ring of separate "can" type combustion chambers 14 in Figure 1 and by an "annular" type combustion chamber 14a in Figure 2.

Figure 3 shows the inlet end of one of the "can" type combustion chambers having, concentrically within its outer wall 14b, a stationary annular wall 15 arranged around a thimble-like upstream end member 16 of the flame chamber casing, the annular space between the walls 14b and 15 providing an air passage. A driven shaft 17 (e. g., driven from the turbine) extends axially, with radial clearance, through the said flame chamber end member and has mounted on it a generally frusto-conical disc-like member 18 of which a concave side faces downstream and is concentrically stepped as shown. A pipe 19 conveys liquid fuel from a supply (not shown) to an axial well 20 of the member 18, the well having an annular lip 21 over which the liquid fuel is centrifuged onto the stepped face as a thin film and is vaporised by the heat in the flame chamber. Any fuel remaining unvaporised when it reaches the next radially outer step 22 (which may be undercut) builds up and is centrifuged over the latter for vaporisation on the succeeding conical annulus, and so on.

The air output from the compressor 11 is divided into two annular streams, of which one passes between the wall 15 and flame chamber member 16 to enter the latter through holes 23 for combustion with the vaporised fuel, and the other passes between the walls 14b and 15 to act as secondary and/or diluent air, a proportion of the second stream entering the flame chamber through an annular opening between the downstream end of the wall 15 and a portion 24 of the flame chamber in known manner, as cooling air for the portion 24.

The arrangement of Figure 4 differs from that of Figure 3 in that an annular baffle 25 is provided internally of the flame chamber for directing the combustion air passing through the holes 23 onto the stepped face of the disc-like member 18.

Referring to Figures 5 and 6, the upstream end member 16a of the flame chamber, instead of being provided with holes 23, is formed with radially-inwardly and forwardly (as regards the engine) directed finger-like pockets 26 of which the upstream sides have holes 23a through which the combustion air is delivered onto the stepped face of the disc-like member 18.

When burning a heavy, low-grade fuel, as is sometimes desirable in the case of marine or industrial engines, such fuel will tend to leave a deposit on the stepped face of the disc-like members. This deposit can, however, be quite easily removed from such a position without having to shut down the engine. Thus in the arrangement of Figure 7 (which is similar to that of Figure 3—although, for the sake of clearness, the fuel pipe is not shown) a scraper 27 is providing for removing any deposit from the stepped face of the disc-like member 18 while it is running. The scraper 27 extends radially through a slot 28 in the upstream end member 16b of the flame chamber and is so supported, at 50 at the top of an enclosure 51 sealing the slot, that it can be rocked for its stepped edge 29 to be engaged with or disengaged from the stepped surface of the member 18 to enable it to be withdrawn, radially outwardly through the slot 28, to occupy the chain line position shown. The flame chamber member 16b is formed with an internal annular trough 30 in which collects the deposit removed by the scraper, and the deposit is discharged through a duct 31, controlled by a cock 31a, by the pressure existing in the combustion chamber. If desired, some suitable provision may be made for cooling the scraper.

Figure 8 shows an upstream end member 16c with holes 23b for the admission of combustion air, and in this case the stepped face of the disc-like member 18a is directed upstream, the fuel supply pipe 19a delivering to an axial well 20 as before, but on the upstream side. The disc-like member 18a has rings of through-holes 32 in the annular faces adjacent the steps so that the fuel, when vaporised by heat conducted through the member 18a, and the combustion air can pass into the main combustion zone. Radially outwardly of each ring of holes 32, and on the downstream side of the member 18a, is a conical ring 33 into which any liquid fuel passing through the holes 32 is centrifuged to be vaporised by the heating of the ring 33 aided by the flow of the mixture of already vaporised fuel and air through the holes 32.

Figure 9 shows a variant of the disc-like member of Figure 8, the member 18c, instead of having annular steps, being provided with concentric rings of holes in which are tubes 34, these tubes standing ahead of the upstream smooth surface and acting in the same way as the steps 22. Obviously the disc of Figure 9 could, if desired, also be provided with rings like 33 on the downstream side.

The annular type combustion chamber shown in Figure 10 has an annular, frusto-conical, stepped member 18b which forms its upstream end and is supported from the radially-outer ends of a ring of radial vanes 35 of which the inner ends are fast with a disc 36 rotatively supported, through a ball bearing 52, from a spindle 17a. Some of the combustion air passes through the vanes 35 to drive the member 18b, and thence through rings of holes 37, in an inner annular wall 38, into the upstream end of the flame chamber. Combustion air also passes through holes 23 in an outer annular wall 16d of the flame chamber, which wall has a radial flange by which it is supported from an annular wall 15a. An outer annulus of diluent air flows between the wall 15a and the outer wall 14a of the combustion chamber, and an inner annulus of diluent air flows between inner and outer annular walls 39, 40, although, obviously, some of this air may be admitted to the combustion chamber in known manner to act as secondary air. The fuel pipe 19b delivers into an annular well 20a which, as in the "can" type, is provided with a lip 21a.

The wall 40, and an adjacent annular wall 41 at its upstream end, can have, at their adjacent ends, seals 42 and 43 for the disc 36.

As regards all of the constructions described above, the rotation of the disc-like member forces the fuel to travel outwardly (in a radial sense) over the lip of the well in a relatively uniform manner. The heat of combustion in the flame chamber will tend to vaporise the fuel travelling along the face of the disc, and, at the next step, any liquid fuel which has not been vaporised can again collect and in due course pass over the second step in a relatively uniform manner. And so on, until, by the time the fuel would have reached the outer periphery of the member, it will all have been vaporised.

By the use of a relatively large well on the stepped face of the disc-like member into which the fuel is fed, it is unnecessary for the fuel to be metered as the centrifugal action of the member will ensure a substantially uniform delivery over the lip of the first step as soon as the well has been charged. The provision of a lip for the well increases the capacity of the well and makes for greater uniformity.

Thus, even for a large engine having an "annular" type of combustion chamber, a single supply of fuel may be sufficient—whereas, previously, it may be that, perhaps, thirty-six metered supplies would be provided.

The heat of the combustion chamber, being applied to the fuel supply pipe or pipes, assists in the vaporising of the fuel.

What we claim as our invention and desire to secure by Letters Patent of the United States is:

1. A liquid fuel combustion chamber comprising a wall defining a duct for a fast-moving body of air, a flame chamber within said duct and spaced from said wall, a disc-like member at the upstream end of said flame chamber, said disc-like member being supported for rotation about an axis which is normal thereto and parallel to the axis of the duct, and said disc-like member being formed with one generally frusto-conical concave face, said face formed with a concentric series of annular frusto-conical vaporising surfaces which are arranged in echelon and united by radially-inward presented imperforate steps, means for supplying liquid fuel on to the stepped face of said member in a position between its said axis and the radially innermost step, means for rotating said member about its said axis to cause the fuel to flow outwardly as a film on the vaporising surfaces, each of said steps acting as a dam which collects the fuel not vaporised on the preceding radially-inner vaporising surface and over which the collected unvaporised fuel flows onto the succeeding radially-outer vaporising surface, and means for diverting a proportion of the air passing along said duct into said flame chamber for combustion with said fuel.

2. A liquid fuel combustion chamber comprising a wall defining a duct for a fast-moving body of air, a flame chamber within said duct and spaced from said wall, a disc-like member at the upstream end of said flame chamber, said disc-like member being supported for rotating about an axis which is normal thereto and parallel to the axis of the duct, said disc-like member being formed with one generally frusto-conical concave face, said face formed with a concentric series of annular frusto-conical vaporising surfaces which are arranged in echelon and united by radially-inward presented imperforate steps, and said disc-like member having in its stepped face a concentric axially-extending well of which the lip is between said axis of said disc-like member and the radially innermost step, means for supplying liquid fuel to said well, means for rotating said member about its said axis to cause the fuel to flow over said lip and outwardly as a film on the vaporising surfaces, each of said steps acting as a dam which collects the fuel not vaporised on the preceding radially-inner vaporising surface and over which the collected unvaporised fuel flows onto the succeeding radially-outer vaporising surface, and means for diverting a proportion of the air passing along said duct into said flame chamber for combustion with said fuel.

3. A liquid fuel combustion chamber, according to claim 2, of which the well has an overhanging lip directed radially inwardly of the disc-like member.

4. A liquid fuel combustion chamber comprising a wall defining a duct for a fast moving body of air, a flame chamber within said duct and spaced from said wall, a disc-like member at the upstream end of said flame chamber, said disc-like member being supported for rotation about an axis which is normal thereto and parallel to the axis of the duct, and said disc-like member being formed on the downstream side with a generally frusto-conical concave face, said face formed with a concentric series of annular frusto-conical vaporising surfaces which are arranged in echelon and united by radially-inward presented imperforate steps, means for supplying liquid fuel on to the stepped face of said member in a position between its said axis and the radially innermost step, means for rotating said member about its said axis to cause the fuel to flow outwardly as a film on the vaporising surfaces, each of said steps acting as a dam which collects the fuel not vaporised on the preceding radially-inner vaporising surface and over which the collected unvaporised fuel flows onto the succeeding radially-outer vaporising surface, and means for diverting a proportion of the air passing along said duct into said flame chamber at the downstream side of said disc-like member for combustion with said fuel.

5. A liquid fuel combustion chamber, according to claim 4, having means for directing the diverted proportion of said air towards said stepped face.

6. A liquid fuel combustion chamber comprising a wall defining a duct for a fast moving body of air, a flame chamber within said duct and spaced from said wall, a disc-like member at the upstream end of said flame chamber, said disc-like member being supported for rotation about an axis which is normal thereto and parallel to the axis of the duct, said disc-like member being formed on the upstream side with a generally frusto-conical concave face, said face formed with a concentric series of annular frusto-conical vaporising surfaces which are arranged in echelon and united by radially-inward presented imperforate steps, and said disc-like member formed with through-holes intermediate said steps, means for supplying liquid fuel on to the stepped face of said member in a position between its said axis and the radially innermost step, means for rotating said member about its said axis to cause the fuel to flow outwardly as a film on the vaporising surfaces, each of said steps acting as a dam which collects the fuel not vaporised on the preceding radially-inner vaporising surface and over which the collected unvaporised fuel flows onto the succeeding radially-outer vaporising surface, and means for diverting a proportion of the air passing along said duct into said flame chamber at the upstream side of said disc-like member for admixture with the fuel vaporised from said stepped face and for combustion therewith after passing through said through-holes.

7. A liquid fuel combustion chamber, according to claim 6, in which the said through-holes are arranged in circles concentric with said axis, and in which there is fast with the downstream side of said disc-like member, radially outwardly of each said circle, the base of a respective concentric frusto-conical ring for collecting unvaporised liquid fuel passing through said through-holes and for providing an additional vaporising surface.

8. A liquid fuel combustion chamber comprising a wall defining a duct for a fast-moving body of air, a flame chamber within said duct and spaced from said wall, a disc-like member at the upstream end of said flame chamber, said disc-like member being supported for rotation about an axis which is normal thereto and parallel to the axis of the duct, and said disc-like member being formed with one generally frusto-conical concave face, said face formed with a concentric series of substantially radially-extending annular frusto-conical vaporising surfaces which are arranged in echelon and united by axially extending radially-inward presented steps, means for supplying liquid fuel on to the concave face of said member in a position between its said axis and the radially innermost step, means for rotating said member about its said axis to cause the fuel under the influence of centrifugal force generated by the rotation of said member to flow radially outwardly as a film over the radially extending vaporizing surfaces, each of said steps being disposed in the path of the radially outwardly moving centrifugally propelled fuel so that each step acts as a dam for collecting the fuel not vaporized on the preceding radially-inner vaporizing surface and acts as a medium for carrying the collected non-vaporized fuel to the succeeding radially-outer vaporizing surface and means for diverting a proportion of the air passing along said duct into said flame chamber for combustion with said fuel.

References Cited in the file of this patent

UNITED STATES PATENTS

| | | |
|---|---|---|
| 2,122,333 | Asbury | June 28, 1938 |
| 2,602,292 | Buckland et al. | July 8, 1952 |

FOREIGN PATENTS

| | | |
|---|---|---|
| 465,449 | Great Britain | May 7, 1937 |
| 492,253 | Great Britain | Sept. 16, 1938 |
| 758,734 | France | Jan. 22, 1934 |